(12) United States Patent
Green et al.

(10) Patent No.: US 6,594,000 B2
(45) Date of Patent: Jul. 15, 2003

(54) AUTOMATIC GAIN CONTROL SYSTEM FOR USE WITH MULTIPLE WAVELENGTH SIGNAL DETECTOR

(75) Inventors: Norman Green, Phoenix, MD (US); Raphael P. Moon, Abingdon, MD (US)

(73) Assignees: Science and Technology Corporation, Hampton, VA (US); The United States of America as represented by the Secretary of the Army, Washington, DC (US)

( * ) Notice: Subject to any disclaimer, the term of this patent is extended or adjusted under 35 U.S.C. 154(b) by 198 days.

(21) Appl. No.: 09/769,575

(22) Filed: Jan. 25, 2001

(65) Prior Publication Data

US 2002/0136251 A1 Sep. 26, 2002

(51) Int. Cl.[7] ............... G01C 3/08; G01C 13/00; H03K 5/02
(52) U.S. Cl. ............... 356/5.01; 342/92; 327/179
(58) Field of Search ............... 356/5.01; 342/92; 327/179

(56) References Cited

U.S. PATENT DOCUMENTS 4,680,588 A * 7/1987 Cantwell ............... 342/92
4,710,772 A * 12/1987 Cantwell et al. ............... 342/92

* cited by examiner

Primary Examiner—Stephen C. Buczinski
(74) Attorney, Agent, or Firm—Peter J. Van Bergen

(57) ABSTRACT

The present invention is an automatic gain control system for use with a multiple wavelength laser LIDAR system that transmits sets of time-separated interrogating signals to generate sets of time-separated return signals. A comparator defines a plurality of unique peak amplitudes and a corresponding plurality of unique binary words associated therewith. The comparator receives each of the laser LIDAR system's return signal from an i-th set thereof and outputs a binary word indicative of a peak amplitude achieved thereby. The binary word is one of the plurality of unique binary words. A memory has each of a plurality of address locations defined by one of the plurality of unique binary words. Each address location stores a unique gain value. An adjustable gain amplifier has a signal input for receiving each return signal and a gain adjustment input coupled to the memory. One of the unique gain values associated with each return signal from the i-th set is supplied to the amplifier's gain adjustment input to adjust the gain thereof for corresponding ones of the return signals from an (i+1)-th set of the return signals.

6 Claims, 3 Drawing Sheets

AUTOMATIC GAIN CONTROL SYSTEM FOR USE WITH MULTIPLE WAVELENGTH SIGNAL DETECTOR

STATEMENT OF GOVERNMENT INTEREST

This invention was made with Government support under contract DAAM01-95-C-0021 awarded by the United States Army. The Government has certain rights in this invention.

FIELD OF THE INVENTION

The invention relates generally to automatic gain control, and more particularly to an automatic gain control system that automatically adjusts the gain of a plurality of incoming signals having varying amplitudes (e.g., return signals from a multiple wavelength laser LIDAR) to output signals having peak amplitudes that fall within a prescribed range regardless of the peak amplitude levels of the incoming signals.

BACKGROUND OF THE INVENTION

The use of automatic gain control systems is prevalent in a variety of applications where it is necessary to boost or reduce a signal level so that the signal level falls within a range of amplitudes that can be handled by a data processor. Specifically, signal levels must be boosted if they are too low to be interpreted by the data processing electronics while signal levels must be reduced if they would saturate the data processing electronics.

One example of a system that produces signals having output levels that change constantly and rapidly is a multiple wavelength laser LIDAR system that can be used to detect a variety of airborne chemical and biological agents. Briefly, such LIDAR systems make use of a frequency agile laser to transmit sets of time-separated laser pulses of varying wavelength into the atmosphere. Laser returns at the varying wavelengths generated by the laser pulses are detected and analyzed to determine the presence and/or concentration of various chemical and biological agents. Each different wavelength is selected to detect a "target" chemical or biological agent having unique absorption and reflection characteristics relative to the specific wavelength.

The problems associated with analyzing the returns from such LIDAR systems are twofold. First, the amplitudes of the transmitted laser pulses will vary from wavelength-to-wavelength. Thus, everything else being equal, the laser returns will also vary in amplitude. Second, since the transmitted pulses will be absorbed/reflected differently depending on the "target" agent in the atmosphere, the signal amplitude of the laser returns can vary greatly. Thus, it is entirely possible that the amplitude of one laser return is too low for the detector/analyzer of the LIDAR system, while the amplitude of the next laser return is so great that it saturates the detector/analyzer of the LIDAR system.

SUMMARY OF THE INVENTION

Accordingly, it is an object of the present invention to provide a system for automatically adjusting the amplitude or level of a return signal received from an interrogating system that transmits sets of time-separated interrogating signals to generate corresponding sets of time-separated return signals.

Another object of the present invention is to provide an automatic gain control system that can be used with a multiple wavelength laser LIDAR system to adjust the signal level associated with each laser return.

Still another object of the present invention is to provide an automatic gain control system for a multiple wavelength laser LIDAR system that adjusts the signal level associated with each laser return to fall within a prescribed window of signal levels.

Yet another object of the present invention is to provide an automatic gain control system for a multiple wavelength laser LIDAR system that can select laser returns within a specified range window.

Other objects and advantages of the present invention will become more obvious hereinafter in the specification and drawings.

The present invention is used in conjunction with an interrogating system (e.g., a multiple wavelength laser LIDAR system) that transmits sets of time-separated interrogating signals to generate sets of time-separated return signals. The present invention is a system for automatically adjusting a level of each of the return signals. A comparator defines a plurality of unique peak amplitudes and a corresponding plurality of unique binary words associated therewith. The comparator receives each return signal from an i-th set of the interrogating signals and outputs a binary word indicative of a peak amplitude achieved thereby. The binary word is one of the plurality of unique binary words. A first memory coupled to the comparator stores each binary word associated with each return signal's peak amplitude from the i-th set. A second memory is coupled to the first memory and has each of a plurality of address locations defined by one of the plurality of unique binary words. Each address location in the second memory stores a unique gain value. An adjustable gain amplifier has a signal input for receiving each return signal and a gain adjustment input coupled to the second memory. One of the unique gain values associated with each return signal from the i-th set is supplied to the gain adjustment input to adjust the gain of the adjustable gain amplifier for corresponding ones of the return signals from an (i+1)-th set of the return signals.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
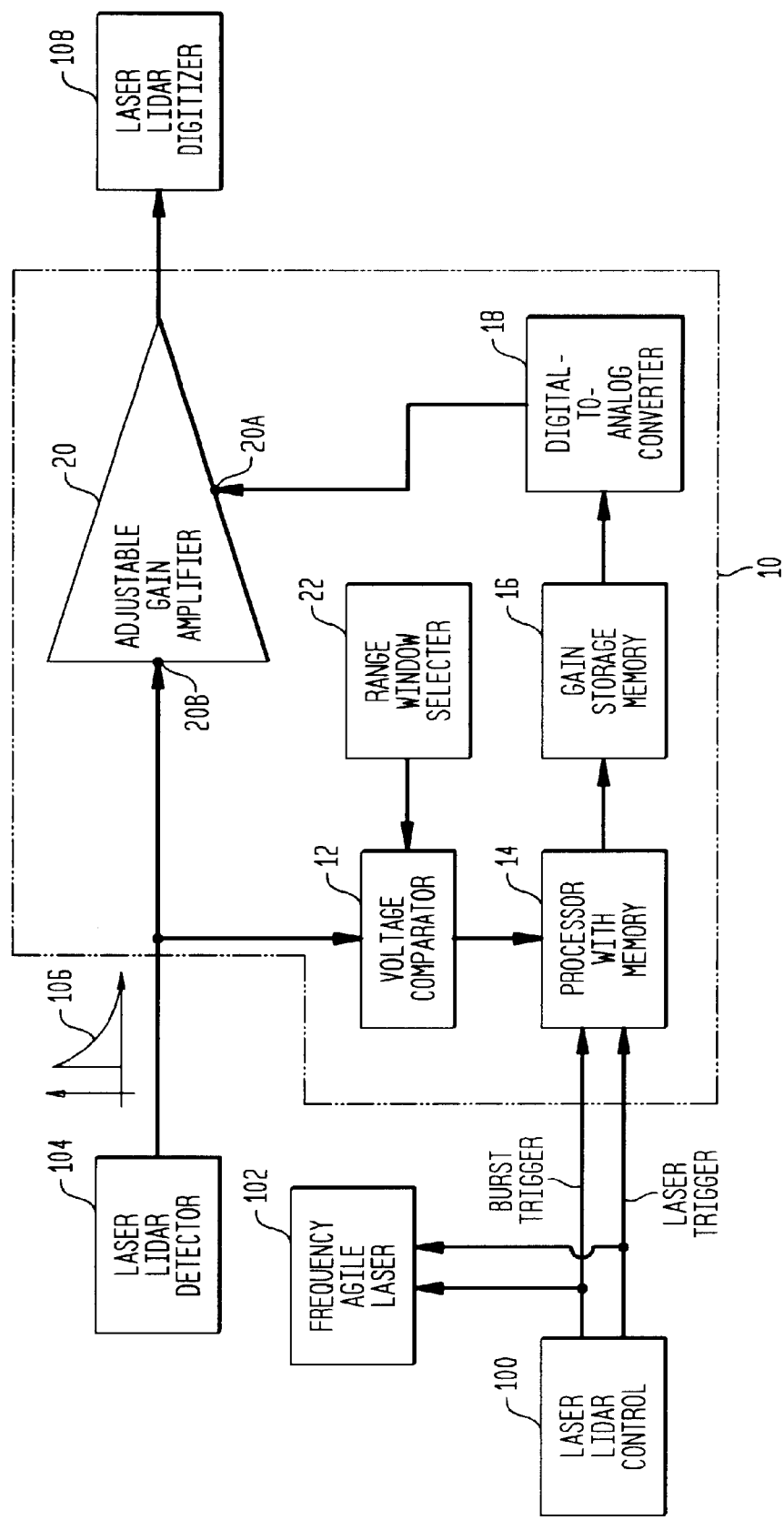
FIG. 1 is a block diagram of the automatic gain control system according to the present invention.

Referring now to the drawings, and more particularly to FIG. 1, an automatic gain control (AGC) system according to the present invention is shown in block diagram form and referenced generally within the dashed-line box indicated by numeral 10. By way of example, AGC system 10 will be explained for its use in processing signal returns from a multiple wavelength laser LIDAR system, the relevant portions; of which are illustrated in FIG. 1 and will be described further below. However, it is to be understood that AGC system 10 can be used to process signals in any interrogating type of system that transmits sets of time-separated interrogating signals to generate corresponding sets of time-separated return signals where automatic gain compensation is required for the return signals.

Before describing AGC system 10, it is necessary to briefly explain the operation of the laser LIDAR system. As mentioned above, only the relevant portions of the laser LIDAR system are shown and described herein. A laser LIDAR control 100 issues a series of pulses to a frequency agile laser 102 to control the transmission of a series of time-separated laser pulses, each of which has a unique wavelength associated therewith. For example, control 100 can be designed to issue a burst trigger pulse as an indicator that a sequence of laser trigger pulses is to follow. That is, the burst trigger pulse identifies the start of a set of time-separated laser pulses. Each pulse in the series of laser trigger pulses following a burst trigger pulse causes laser 102 to output one of the unique-wavelength laser pulses. The sequence a burst trigger pulse followed by laser trigger pulses is continually repeated during operation of the laser LIDAR system.

As is well known in the art, each transmitted laser pulse causes a laser return to be generated by a "target", e.g., an area of the atmosphere, an object, etc. In many environments, there could be more than one return generated by each laser pulse. For example, a light cloud located at a first range relative to the laser might scatter some of the incident laser energy to generate a weak return, while energy passing through the cloud could encounter another "target" at a greater range. If the second "target" is a "hard" target (e.g., mountain, tree, etc.), this later-generated return could be much larger in amplitude than the return generated by the cloud. In such a case, if the cloud was the desired "target", the present invention can utilize a range gating or windowing feature to essentially select the return from the target of interest as will be explained further below. Accordingly, a "return" as referred to herein will be assumed to have originated from a target of interest located at a range of interest.

The time separation between each of the laser pulses transmitted by laser 102 is sufficient for the relevant portion of the returns from the target to be detected at a laser LIDAR detector 104. This time separation is a function of the laser LIDAR system and the range of the "target" of interest and, therefore, is not a limitation of the present invention. However, the time separation may need to be considered by AGC system 10 if such time separation is less than the time needed for AGC system 10 to process a return signal.

Detector 104 receives each laser return (associated with the last transmitted laser pulse) and converts same to a pulse voltage signal 106 which is usually longer than the transmitted pulse depending on target characteristics. Pulse voltage signal 106 represents the dynamic range of the laser return. Before being analyzed from an information perspective, pulse voltage signal 106 output from detector 104 is digitized by a laser LIDAR digitizer 108, which typically has a limited dynamic range of operation. That is, the signal to be digitized must fall within a specific voltage range. Voltages below this range could be measured inaccurately, while voltages above this range saturate digitizer 108 thereby clipping relevant information from the laser return. Note that while clipping must be avoided, it is desirable to make the digitizer's input as large as possible for optimum accuracy.

As described above in the "Background of the Invention", multiple wavelength laser LIDAR systems inherently generate signal returns having a broad dynamic range. This is because the amplitudes of the transmitted pulses of varying wavelength generated by laser 102 tend to vary, and because the various wavelengths are affected differently by their "target". To correct this problem, AGC system 10 automatically adjusts the level of each pulse voltage signal 106 associated with a laser return so that each pulse voltage signal falls within the dynamic range capability of digitizer 108. In this way, low-voltage portions of a laser return are not measured inaccurately and high-voltage portions are not clipped.

The components of AGC system 10 include a voltage comparator 12 coupled to detector 104, a processor 14 having memory storage capability coupled to voltage comparator 12, a gain storage memory 16 coupled to processor 14, a digital-to-analog (D/A) converter 18 coupled to gain storage memory 16, and an adjustable gain amplifier 20 having it's gain adjustment input 20A coupled to D/A converter 18 and having it's signal input 20B coupled to detector 104. Finally, AGC system 10 can include a range window selector 22 selectively activating/deactivating voltage comparator 12 during a prescribed time window in order to effectively define a range of operation for the laser LIDAR system.

The basic processing concept of the present invention will now be explained. Each pulse voltage signal 106 indicative of a laser return is supplied to AGC system 10 by detector 104. Specifically, pulse voltage signal 106 is provided to voltage comparator 12 and to adjustable gain amplifier 20. Voltage comparator 12 detects the peak amplitude of pulse voltage signal 106 and compares the peak amplitude thereof with a plurality of voltage windows or levels. Voltage comparator 12 is configured to define a plurality of voltage levels and output a binary word indicative of the voltage level associated with the peak amplitude. For example, voltage comparator 12 could define nine voltage levels and corresponding binary words as follows:

| VOLTAGE LEVEL | BINARY WORD |
| --- | --- |
| Less than 5 millivolts (mv) | 00000000 |
| 5–20 mv | 00000001 |
| 20.1–38.6 mv | 00000011 |
| 38.7–74.5 mv | 00000111 |
| 74.6–144 mv | 00001111 |
| 144.1–277 mv | 00011111 |
| 277.1–536 mv | 00111111 |
| 536.1–1034 mv | 01111111 |
| 1034.1–1995 mv | 11111111 | where the binary word "00000000" is essentially indicative of no return.

Voltage comparator 12 outputs the binary word indicative of the particular voltage level achieved by the peak amplitude of pulse voltage signal 106. This binary word is supplied to processor 14 and is stored therein at a selected address location. The selected address location can be controlled using the burst trigger pulse and laser trigger pulses issued by laser control 100 as will be explained further below.

Each binary word issued by voltage comparator 12 indicates an address location in gain storage memory 16. Each such address location stores a digital gain value that will adjust the peak amplitude of pulse voltage signal 106 to fall within the dynamic range capability of digitizer 108. Thus, each binary word issued by voltage comparator 12 serves as a pointer to one of the address locations in gain storage memory 16. The number of gains and their values can be pre-selected based on the expected range of peak amplitudes for all laser returns and the dynamic range capability of digitizer 108.

The address location in gain storage memory 16 pointed to by the binary word is read with the gain value being supplied to D/A converter 18, which converts the digital gain value to an analog signal representation thereof. The resulting analog gain is supplied to gain adjustment input 20A of amplifier 20 so that amplifier 20 appropriately adjusts continuous voltage signal 106 provided at signal input 20B prior to its presentation to digitizer 108. In general, the present invention uses the gain value associated with the previous set of burst trigger pulse/laser trigger pulses to adjust the gain of amplifier 20 for the current set of burst trigger pulse/laser trigger pulses. This is a satisfactory solution because the time delay between sets is short (i.e., less than a second) while targets of the laser LIDAR system undergo slow changes.

The operating range of the laser LIDAR system can effectively be defined by only allowing a specific time window of pulse voltage signal 106 to pass through AGC system 10. This can be accomplished by only activating voltage comparator 12 during the specific time defined by range window selector 22.

While the above generally describes the present invention, there can be timing issues to consider in a specific application. For example, if the time between a set's burst trigger pulse and it's first laser trigger pulse is very short (e.g., on the order of nanoseconds) relative to the time associated with gain stabilization of amplifier 20 and D/A conversion of D/A converter 18 (e.g., on the order of micro seconds), the gain for a set's first laser pulse can be set after the previous set's final laser pulse. This example will be explained further below.

Figure 2:
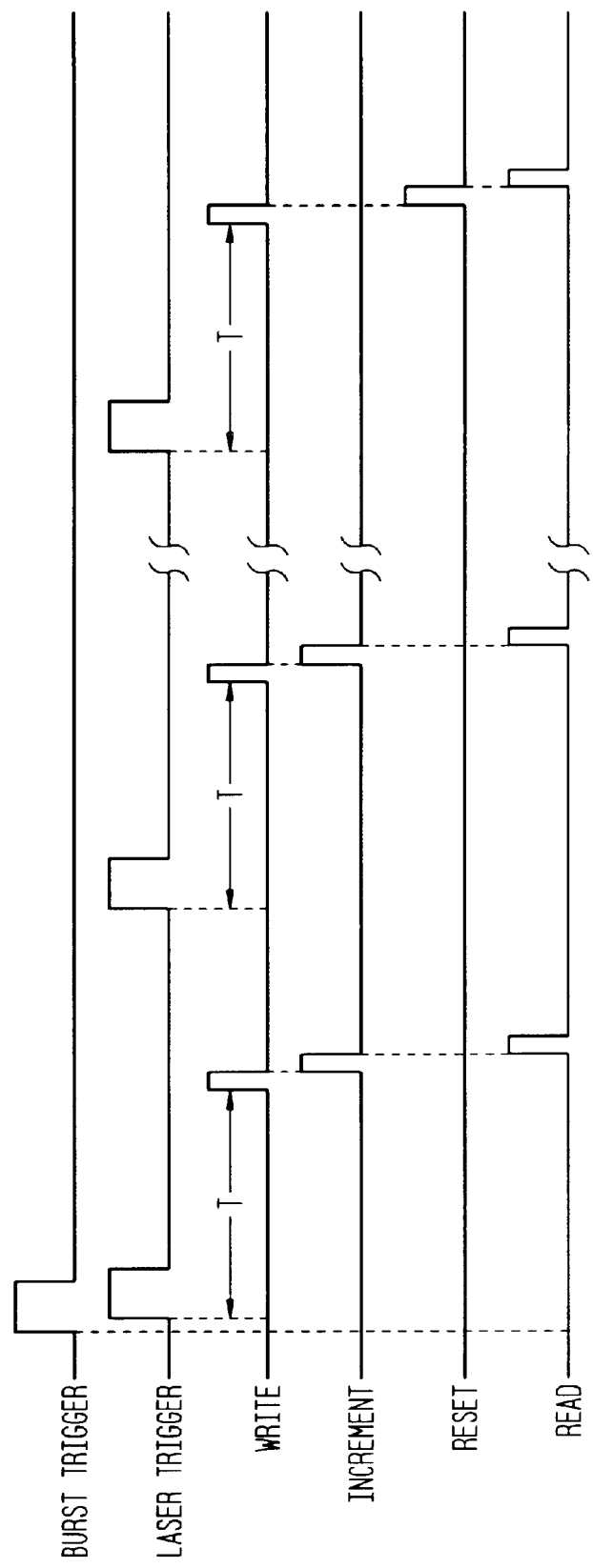
FIG. 2 is a timing diagram depicting the relationship between a burst trigger pulse and laser trigger pulses issued by a laser LIDAR system, and the WRITE, INCREMENT, READ and RESET pulses generated by the automatic gain control system of the present invention.

To better explain the operation of the present invention, consider the following example. Assume that a set of burst trigger pulse/laser trigger pulses consists of a burst trigger pulse followed by M time-separated laser trigger pulses issued by laser LIDAR control 100. Refer also to the timing diagram of FIG. 2 where the burst trigger pulse and it's associated first two laser trigger pulses and last laser trigger pulse generated by control 100 are shown. Also depicted are WRITE, INCREMENT, READ and RESET pulses generated by processor 14.

For the i-th set of burst trigger pulse and M laser trigger pulses, operation of AGC system 10 is as follows. When the system is first powered up, gains for all returns are pre-set to a predetermined value, e.g., unity. When i=1, processor 14 initializes an address counter for it's memory to a selected first address location. During each time interval T (of the i-th set), laser returns are observed/detected by the laser LIDAR system at detector 104. Note that time interval T is a function of the laser LIDAR system and its particular application.

During the first interval T, detector 104 supplies pulse voltage signal 106 to comparator 12 which issues a binary word indicative of the peak amplitude associated with the first laser return. At the conclusion of the first interval T, processor 14 issues a WRITE pulse that stores this binary word in it's memory. Processor 14 then issues an INCREMENT pulse that sequences it's memory to the next address location. Processor 14 also uses this binary word as a pointer to a gain address location in gain storage memory 16. Processor 14 issues a READ pulse that causes the contents of the "pointed to" location in memory 16 to be read with the gain value being converted to an analog gain by D/A converter 18. The analog gain is supplied to amplifier 20.

This processing continues for each k-th laser return (where k=1 to M) in the i-th set. Following the M-th laser trigger pulse in the i-th set, a RESET pulse resets the memory of processor 14 to it's initial address location where the (voltage gain) binary word associated with the first laser pulse of the i-th set is stored. Thus, the READ pulse next issued by processor 14 sets the gain for the first laser pulse of the (i+1)-th set. The above processing is repeated for the (i+1)-th set of burst trigger pulse and it's M laser trigger pulses. The gains determined for the i-th set of M laser trigger pulses are applied to the (i+1)-th set of M laser trigger pulses.

Figure 3:
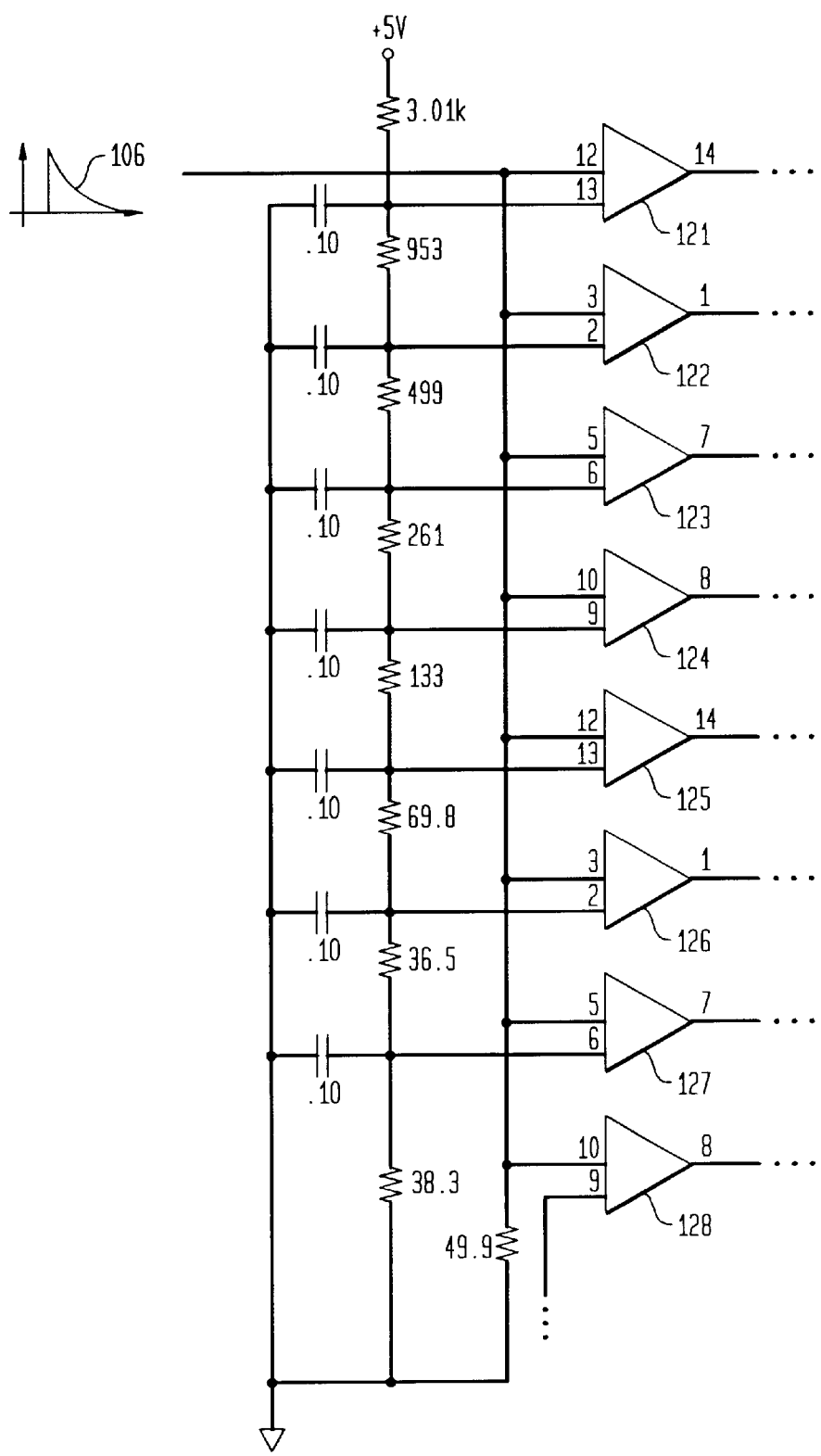
FIG. 3 is a schematic of one embodiment of a voltage comparator that can be used in the present invention.

Each of the functional blocks of AGC system 10 can be implemented in a variety of ways as would be understood by one of ordinary skill in art. For example, voltage comparator 12 could be realized by a plurality of voltage comparators arranged in the ladder configuration to successively detect threshold voltages as illustrated in FIG. 3 where eight comparators 121–128 are the MAX 908CPD comparators available from Maxim Integrated Products, Inc., Sunnyvale, Calif. That is, each of comparators 121–128 can set one bit of an 8-bit word. For example, if the peak amplitude of a signal triggers the thresholds of only comparators 121–123, the generated binary word will be "00000111". If none of the voltage thresholds of comparators 121–128 are achieved, the binary word is "00000000".

Processor 14 with it's memory can be realized by separate processor/memory hardware or by an integrated unit. Further, is board space is a consideration, another option is to use a field programmable gate array (FPGA) to implement the functions of processor 14. Thus, it is to be understood that processor 14 with it's logic and memory can be realized in a variety of ways known to one of ordinary skill in the art.

Gain storage memory 16 can be realized by a digital EPROM device while D/A converter 18 is well understood in the art. Adjustable gain amplifier 20 can be implemented by any one of a variety of such amplifiers available in the art. A digitally adjustable gain amplifier could also be used/connected directly to gain storage memory 18 thereby eliminating the need for D/A converter 18. Range window selector 22 could be realized by timing devices such as a pair of down counters, one of which defines a time "ON" while the other defines a time "OFF" for voltage comparator 12. Each such down counter could trigger off the leading edge of each laser trigger pulse.

The advantages of the present invention are numerous. The widely varying gains of multiple wavelength laser LIDAR system are automatically adjusted to prevent the loss of pertinent data. Furthermore, the present invention will find great utility in any interrogating system that transmits sets of time-separated interrogating signals to generate corresponding sets of time-separated return signals where the dynamic range of individual returns varies beyond the range capability of data processing and analysis hardware.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. In a multiple wavelength laser LIDAR system that generates laser trigger pulses and transmits time-separated laser pulses of varying wavelength in response thereto to generate corresponding time-separated laser returns of varying wavelength, wherein each of said laser returns is detected and converted to a pulse voltage signal representation thereof, an automatic gain control system for use with said LIDAR system comprising:

a voltage comparator coupled to said LIDAR system for receiving said pulse voltage signal, detecting a peak amplitude of said pulse voltage signal, comparing said peak amplitude with N increasing voltage levels, and generating a binary word having a plurality of bits wherein successively significant ones of said plurality of bits are set to a logical "1" in correspondence with ones of said increasing voltage levels that are exceeded by said peak amplitude, and wherein N possible binary words can be generated;

a processor having a memory with addressable locations, said processor coupled to said LIDAR system and said comparator for selecting one of said addressable locations upon receipt of each of said laser trigger pulses and for storing said binary word at said one of said addressable locations;

a gain storage memory coupled to said processor and having N address locations defined by said N possible binary words, each of said N address locations storing a unique gain value;

said processor selecting one of said N address locations defined by said binary word and causing said one of said N address locations to be read wherein one said unique gain value is made available as a selected gain; and a voltage controlled amplifier having a signal input and a gain adjustment input, said signal input coupled to said LIDAR system for receiving said pulse voltage signal, said gain adjustment input coupled to said gain storage memory for receiving said selected gain associated with said binary word.

2. A system as in claim 1 further comprising means coupled to said voltage comparator for causing said binary word to be generated only for a time window portion of said continuous voltage signal.

3. A system as in claim 1 wherein said gain storage memory is a digital device and each said unique gain value is stored as a digital value, said system further comprising an analog-to-digital converter coupled between said gain storage memory and said gain adjustment input for converting said digital value to an analog representation thereof.

4. In a multiple wavelength laser LIDAR system that generates laser trigger pulses and transmits sets of M time-separated laser pulses of varying wavelength in response thereto to generate sets of M time-separated laser returns of varying wavelength, wherein each of said laser returns is detected and converted to a k-th pulse voltage signal representation thereof where k=1 to M, an automatic gain control system for use with said LIDAR system comprising:

a voltage comparator coupled to said LIDAR system for receiving each said k-th pulse voltage signal corresponding to an i-th set of said laser returns, detecting a k-th peak amplitude of each said k-th pulse voltage signal, comparing each said k-th peak amplitude with N increasing voltage levels, and generating a k-th binary word corresponding to each said k-th peak amplitude, each said k-th binary word having a plurality of bits wherein successively significant ones of said plurality of bits are set to a logical "1" in correspondence with ones of said increasing voltage levels that are exceeded by said k-th peak amplitude, and wherein N possible binary words can be generated;

a processor having a memory with addressable locations, said processor coupled to said LIDAR system and said comparator for storing each said k-th binary word associated with said i-th set of said laser returns at a selected one of said addressable locations in response to each of said laser trigger pulses;

a gain storage memory coupled to said processor and having N address locations defined by said N possible binary words, each of said N address locations storing a unique gain value;

said processor selecting one of said N address locations defined by each k-th binary word associated with an (i+1)-th set of said laser returns and causing said one of said N address locations to be read wherein one said unique gain value is made available as a selected gain; and a voltage controlled amplifier having a signal input and a gain adjustment input, said signal input coupled to said LIDAR system for receiving each k-th pulse voltage signal corresponding to said (i+1)-th set of said laser returns, said gain adjustment input coupled to said gain storage memory for receiving said selected gain associated with said k-th binary word associated with said i-th set of said laser returns.

5. A system as in claim 4 further comprising means coupled to said voltage comparator for causing each said k-th binary word associated with said i-th set of said laser returns to be generated only for a time window portion of said k-th pulse voltage signal corresponding to said i-th set of said laser returns.

6. A system as in claim 4 wherein said gain storage memory is a digital device and each said unique gain value is stored as a digital value, said system further comprising an analog-to-digital converter coupled between said gain storage memory and said gain adjustment input for converting said digital value to an analog representation thereof.

* * * * *